United States Patent
Spörl

(10) Patent No.: US 11,446,758 B2
(45) Date of Patent: Sep. 20, 2022

(54) INSULATION PART AND LASER MACHINING HEAD WITH INSULATION PART DETECTING SENSOR

(71) Applicant: PRECITEC GMBH & CO., Gaggenau (DE)

(72) Inventor: Georg Spörl, Rheinstetten (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 357 days.

(21) Appl. No.: 16/326,155

(22) PCT Filed: Jul. 28, 2017

(86) PCT No.: PCT/EP2017/069227
§ 371 (c)(1),
(2) Date: Feb. 15, 2019

(87) PCT Pub. No.: WO2018/033372
PCT Pub. Date: Feb. 22, 2018

(65) Prior Publication Data
US 2019/0202001 A1    Jul. 4, 2019

(30) Foreign Application Priority Data
Aug. 19, 2016  (DE) .................. 10 2016 115 415.6

(51) Int. Cl.
*B23K 26/04*   (2014.01)
*B23K 26/14*   (2014.01)
(Continued)

(52) U.S. Cl.
CPC ........ *B23K 26/048* (2013.01); *B23K 26/0342* (2015.10); *B23K 26/1462* (2015.10);
(Continued)

(58) Field of Classification Search
CPC .............. B23K 26/048; B23K 26/0342; B23K 26/1462; B23K 26/702; B23K 26/38;
(Continued)

(56) References Cited

U.S. PATENT DOCUMENTS

| 4,951,388 A * | 8/1990 | Eguchi ................. H05K 13/046 |
| | | 156/497 |
| 2013/0193119 A1* | 8/2013 | Broger ............... B23K 26/1464 |
| | | 219/121.6 |

(Continued)

FOREIGN PATENT DOCUMENTS

| CN | 87207013 U | 1/1988 |
| CN | 2097057 U | 2/1992 |

(Continued)

OTHER PUBLICATIONS

PCT International Search Report and Written Opinion, PCT Application No. PCT/EP2017/069227, dated Dec. 1, 2017, ten pages.
(Continued)

*Primary Examiner* — Tu B Hoang
*Assistant Examiner* — Yeong Juen Thong
(74) *Attorney, Agent, or Firm* — Fenwick & West LLP

(57) ABSTRACT

An insulation part for supporting an electrically conductive nozzle in an insulated manner, and a laser machining head with a housing (10), through which a working laser beam path (11) is guided. The working laser beam path (11) exits on the machining side through an electrically conductive nozzle (17). The electrically conductive nozzle (17) is supported on an insulation part (18), which is supported on the housing (10), and which, for the capacitive distance measurement, is electrically connected to an oscillating circuit (24) of a distance measuring circuit (22). To monitor the presence of an inexpensive insulation part (18) in a user-friendly manner, the insulation part (18) comprises a
(Continued)

Figure 1:
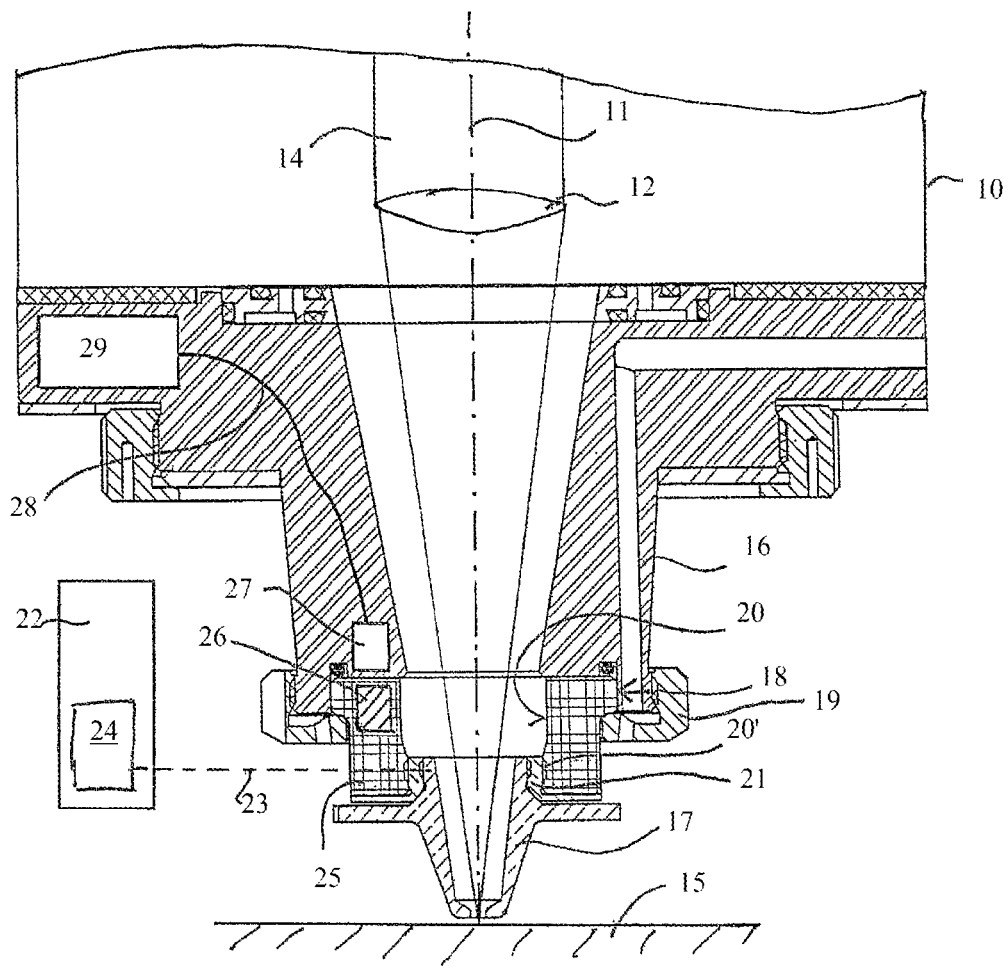

ferromagnetic body (26) and a sensor (27) for detecting the ferromagnetic body (26) is provided on the housing (10). The sensor is connected to a monitoring circuit (29) that, in the absence of an insulation part (18), outputs a warning signal.

6 Claims, 1 Drawing Sheet

(51) Int. Cl.
    *B23K 26/03* (2006.01)
    *B23K 26/70* (2014.01)
    *B23K 26/38* (2014.01)
    *G01D 5/241* (2006.01)

(52) U.S. Cl.
    CPC ............ *B23K 26/38* (2013.01); *B23K 26/702* (2015.10); *G01D 5/2417* (2013.01)

(58) Field of Classification Search
    CPC .. B23K 26/53; B23K 26/064; B23K 26/0006; B23K 26/0626; B23K 26/0648; B23K 26/0652; B23K 26/0736; B23K 26/0823; B23K 26/046; B23K 26/1482; B23K 26/14; G01D 5/2417; Y10T 428/26; Y10S 372/701
    USPC ............ 219/121.67, 121.72, 121.73, 121.74, 219/121.75, 121.76, 121.77, 121.84, 219/121.85, 121.78, 121.7, 121.63, 219/121.64, 121.69; 318/575; 428/332; 439/595; 372/109, 701
    See application file for complete search history.

(56) References Cited

U.S. PATENT DOCUMENTS

| | | | |
|---|---|---|---|
| 2015/0360468 A1* | 12/2015 | Taff | B01F 13/0818 347/9 |
| 2016/0288260 A1* | 10/2016 | Kobayashi | B23K 26/12 |
| 2016/0338408 A1* | 11/2016 | Guenther, Jr. | B23P 19/027 |
| 2018/0210040 A1* | 7/2018 | Shimoto | H01L 43/02 |

FOREIGN PATENT DOCUMENTS

| | | |
|---|---|---|
| CN | 101722966 A | 6/2010 |
| CN | 202124028 U | 1/2012 |
| CN | 202285218 U | 6/2012 |
| CN | 202344128 U | 7/2012 |
| CN | 103124613 A | 5/2013 |
| CN | 104080570 A | 10/2014 |
| DE | 17 65 002 A1 | 6/1971 |
| DE | 37 19 552 C1 | 11/1988 |
| DE | 42 01 640 C1 | 2/1993 |
| DE | 40 35 403 C2 | 6/1993 |
| DE | 42 17 292 A1 | 12/1993 |
| DE | 199 06 442 A1 | 9/2000 |
| DE | 101 21 655 C1 | 10/2002 |
| DE | 20 2010 004 903 U1 | 7/2010 |
| EP | 2 444 193 A1 | 4/2012 |
| EP | 1 977 193 B1 | 9/2015 |
| WO | WO 2012/052863 A1 | 4/2012 |
| WO | WO 2013/071283 A1 | 5/2013 |

OTHER PUBLICATIONS

PCT International Preliminary Report on Patentability, PCT Application No. PCT/EP2017/069227, dated Dec. 19, 2018, 20 pages.
China National Intellectual Property Administration, The First Office Action, CN Patent Application No. 201780050020.1, dated Jul. 3, 2019, ten pages.

\* cited by examiner

INSULATION PART AND LASER MACHINING HEAD WITH INSULATION PART DETECTING SENSOR

The invention relates to an insulation part for supporting an electrically conductive nozzle, in particular a cutting nozzle tip, in an insulated manner on a laser machining head as well as a laser machining head provided therewith, in particular a laser machining head with integrated capacitive distance regulation.

To be able to reach optimal machining quality and the highest machining speed in response to the laser machining, it is required that the distance between workpiece and laser machining head, in particular the distance between cutting nozzle and workpiece, are kept constant, because the smallest deviations already diminish the machining quality. Deviations from the target distance lead to burr formation or unfavorably impact the cutting speed, the roughness depth of the cutting surfaces and the gap width, in particular in response to the laser cutting. Laser machining heads, in particular laser cuttings heads, are thus equipped with a capacitive distance measuring system for capacitively measuring the distance between workpiece and cutting nozzle. The distance measuring system has a conductive cutting nozzle tip, as sensor electrode, which, with the workpiece, forms the measuring capacitor, which is integrated into an oscillating circuit. To fasten the conductive cutting nozzle tip to the nozzle body of the laser machining head, parts are frequently used, which do not only serve the purpose of supporting the conductive nozzle tip, but also for the electric insulation thereof against the nozzle body and the housing.

Insulation parts of a known design are often made of ceramic material, aluminum with insulating coating or with an insulation by plastic rings.

If the user forgets to insert this insulation part and starts the distance regulation, the laser machining head is moved against the workpiece and collides with it, because the nozzle tip is then connected to ground, as is the workpiece, so that a capacitor between nozzle tip and workpiece cannot be formed.

A method, in which it can be detected when the insulation part is missing, by monitoring the internal capacitance of the nozzle assembly, is known from DE 101 21 655 C1. A collision of the laser machining head with the workpiece can then be prevented by means of a corresponding signal processing. This method requires, however, that the nozzle support forms an internal capacitance with the conductive nozzle tip and can thus be monitored for the presence of an insulation.

In the case of capacitance measuring devices for the distance regulation, which work according to the principle of the active shielding, the internal capacitance is eliminated by means of the measuring method and can thus not be used for the monitoring.

A method for capacitively measuring the distance between a sensor electrode and a workpiece is known from DE 199 06 442 A1, in the case of which the measuring line to the sensor electrode is actively shielded, wherein the measuring voltage tapped via the measuring line is applied to the shielding of the measuring line via an impedance converter. Internal or parasitic capacitances, which are parallel to the measuring capacitance, can be reduced significantly in this way. However, the internal or parasitic capacitances are thus also not available for monitoring the presence or absence of an insulation part.

It is known from DE 42 01 640 C1 to provide two lines in an insulation part, which are connected to one another via the conductive nozzle tip. An interruption of this connection can be evaluated to determine whether or not the insulation part is present or whether the sensor element is absent. This solution, however, is mechanically highly complex and thus creates costs, which are disproportionately high for a wear part.

An insulator of a two-piece construction for the insulated support of an electrically conductive nozzle on a laser machining head, which consists of an insulation part for the electrical insulation, and of a shielding part for shielding against radiation and/or heat, and which has a central through opening for a working laser beam is known from EP 1 977 193 B1. The two-piece embodiment of the insulator makes it possible to provide an insulator, which is simpler in terms of production and thus inexpensive, for a laser machining head. The shielding part serves the purpose of shielding against laser radiation reflected back from a workpiece and consists of a non-conductive material, which is resistant to heat.

EP 2 444 183 A1 describes an insulating section of a laser machining head for supporting an electrically conductive nozzle. The insulating section comprises an outer insulation part and an inner insulation part, which are arranged coaxially to one another and have a central through opening for a working laser beam. An accommodation for a sensor part, which forms a type of metal interface between a contact pin in the insulating section and the electrically conductive nozzle, is provided in the through opening of the outer insulation part. The inner insulation part can be embodied as simple metal sleeve and can consist of brass, aluminum, copper or stainless steel. With the first insulation part, the insulating section makes it possible to provide an electrical insulation and, with the second insulation part, to shield the first insulation part against thermal impacts from the working laser beam.

The invention is thus based on the object of providing an insulation part for supporting a nozzle tip on a laser machining head, the production of which is inexpensive and the absence or presence of which on a laser machining head can be monitored in a user-friendly manner. The invention is further based on the object of creating a laser machining head, which is suitable for a user-friendly monitoring of the absence or presence of the insulation part.

According to the invention, an insulation part, which supports an electrically conductive nozzle on a housing of a laser machining head in an insulated manner with respect thereto, thus comprises a piece of a ferromagnetic material, the presence of which can be detected by means of a sensor. This embodiment of the insulation part does not only provide for an inexpensive production of the insulation part, but also a user-friendly monitoring of the presence of the insulation part, so that the risk of damages to a laser machining head due to a faulty distance regulation can be ruled out securely.

It is provided in the case of an advantageous embodiment of the invention that the electrically insulating body is a ceramic body, in which the ferromagnetic body is embedded. Due to this embodiment of the insulation part, the latter can be produced particularly inexpensively, because, except for the embedding of the ferromagnetic body, the production can take place in the same way as in the case of common insulation parts.

It is provided in a different embodiment of the invention that the insulation part comprises a ring-shaped ferromagnetic body, which is embedded in an electrically insulating coating made of plastic.

Instead of the use of a ferromagnetic material, such as iron, for example, it is also possible according to a further development of the invention to use an alloy with a low Curie temperature, in particular a nickel/cobalt/iron-based alloy. In the case of temperatures below the Curie temperature, the presence of the insulation part can be detected by means of such a ferromagnetic body. If the temperature of the laser machining head and thus the temperature of the ferromagnetic body rises above the Curie temperature thereof, the body can no longer be sensed by a sensor, which then outputs a corresponding warning signal to a machine controller. Not only the presence of an insulation of the conductive nozzle can thus be monitored in a simple manner, but the laser machining head can be protected against overheating as well.

An advantageous embodiment of the invention is characterized in that a sensor for detecting the ferromagnetic body of the insulation part is provided on a housing of a laser machining head, on which an electrically conductive nozzle of a distance measuring circuit is supported by means of an insulation part according to the invention, said sensor being connected to a monitoring circuit, which outputs a warning signal in the absence of an insulation part.

Figure 2:
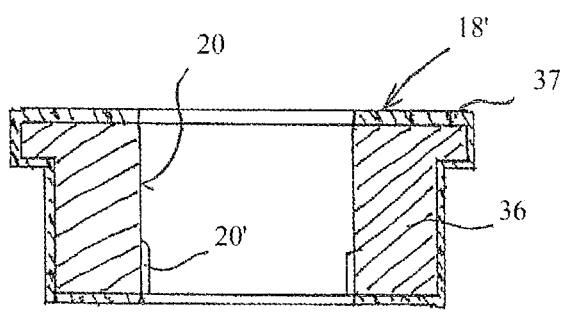

The invention will be described in more detail below, for example by means of the drawing, where:

FIG. 1 shows a schematic, simplified sectional view of a laser machining head, and FIG. 2 shows a schematic, simplified sectional view of a further insulation part for a laser machining head.

Components, which correspond to one another, are provided with identical reference numerals in the different figures of the drawing.

As illustrated in FIG. 1, a laser machining head has a housing 10, through which a working laser beam path 11 is guided, in which a lens assembly 12 for focusing a working laser beam 14 to a workpiece 15 is provided. A nozzle head 16, on which an electrically insulating nozzle 17 is provided, which is electrically insulated against the nozzle body 16 by an insulation part 18, is attached to the machining-side end of the housing 10. The insulation part 18 is fastened to the nozzle body 16, for example by means of a cap nut 19. As can be seen particularly well in FIG. 2, the insulation part 18, 18' has a central through opening 20, which, on its machining-side end, is provided with an internal thread 20', is screwed into the electrically conductive nozzle 17 with a corresponding counter thread 21.

The electrically conductive nozzle 17, which consists of copper, for example, is electrically connected to an oscillating circuit 24 of a capacitive distance measuring circuit 22, as is schematically suggested by the dashed line 23. The electrically conductive nozzle 17, together with the workpiece 15, forms a capacitor, which is integrated into the oscillating circuit 24 of the capacitive distance measuring circuit 22, and the capacitance of which changes with the distance between laser machining head and workpiece 15, thus with the distance between electrically conductive nozzle 17 and workpiece 15. The capacitive distance measurement is known to the person of skill in the art and is described, for example, in the prior art publications mentioned above. The distance measurement thus does not need to be described in more detail.

According to a first exemplary embodiment of the invention, the insulation part 18 has a ring-shaped ceramic body 25, in which a ferromagnetic body 26 is embedded. A sensor 27 for detecting the ferromagnetic body 26, is arranged in the nozzle body 16, located opposite to the ferromagnetic body 26. The sensor 27 is connected via a line 28 to a monitoring circuit 29, which, in the absence of an insulation part 18, outputs a warning signal to a machine controller, which is not illustrated, and thus blocks the distance regulation.

In the alternative, the insulation part 18' can also have a ferromagnetic body 36, which essentially has the shape of the ring-shaped ceramic body 25, and which is embedded in a plastic coating or sheathing 37. Instead of the insulating coating, plastic rings can also be provided in a manner, which is not illustrated in more detail, which realize the required insulation of the electrically conductive nozzle 17 against the nozzle body 16 and the housing 10 of the laser machining head.

Instead of a ferromagnetic material, such as iron, for example, an alloy with low Curie temperature, in particular a nickel/cobalt/iron (NiCoFe)-based alloy, can be provided as well. Such NiCoFe-based alloys with further metallic and non-metallic additives, which are ferromagnetic below their Curie temperature, but which lose their ferromagnetic property when exceeding the Curie temperature, are known in the prior art. Due to this property, it is then possible to protect the laser machining head against overheating, with suitably selected alloy with matching Curie temperature, because the ferromagnetic body 26, 36 can no longer be detected when exceeding the Curie temperature, so that the monitoring circuit 29 outputs a corresponding warning signal to the machine controller, which then interrupts the ongoing machining of a workpiece.

According to the invention, the presence of the insulation part 18 between electrically conductive nozzle 17 and nozzle body 16 or housing 10 can thus be monitored in a simple manner by detecting the ferromagnetic body 26, 36, which is embedded in the insulation part, so that a collision between laser machining head and workpiece due to a faulty capacitive distance measurement cannot be ruled out reliably.

The invention claimed is:

1. A laser machining head comprising:
   a housing through which a working laser beam is guided;
   an electrically conductive nozzle through which the working laser beam from the housing enters and exits to a workpiece, wherein the nozzle is electrically connected to an oscillating circuit for a capacitive measurement of a distance from the electrically conductive nozzle to the workpiece;
   an insulation part attached between the electrically conductive nozzle and the housing, wherein the insulation part has a central through opening for a working laser beam path and wherein the insulation part further comprises a ferromagnetic body ; and
   a sensor in the housing configured to detect attachment of the insulation part to the housing by detecting the ferromagnetic body of the insulation part, the sensor connected to a monitoring circuit configured to output a warning signal when the insulation part is not attached to the housing.

2. The laser machining head of claim 1, wherein the insulation part comprises a ring-shaped electrically insulating body that has the central through opening for the working laser beam path.

3. The laser machining head of claim 2, wherein the electrically insulating body is a ceramic body, and wherein the ferromagnetic body is embedded in the ceramic body.

4. The laser machining head of claim 1, wherein the ferromagnetic body is ring-shaped having a central through opening for the working laser beam path, and wherein the insulation part comprises an electrically insulating plastic in which the ring-shaped ferromagnetic body is embedded.

5. The laser machining head of claim 4, wherein the ferromagnetic body consists of an alloy having a Curie temperature, and the sensor is further configured to detect whether a temperature of the ferromagnetic body increases above the Curie temperature.

6. The laser machining head of claim 5, wherein the alloy is a nickel/cobalt/iron (NiCoFe)-based alloy.

* * * * *